Dec. 6, 1966 W. R. DUNN 3,289,692
SPRING ADJUSTING MEANS FOR A PRESSURE OPERATED VALVE
Filed Aug. 5, 1964
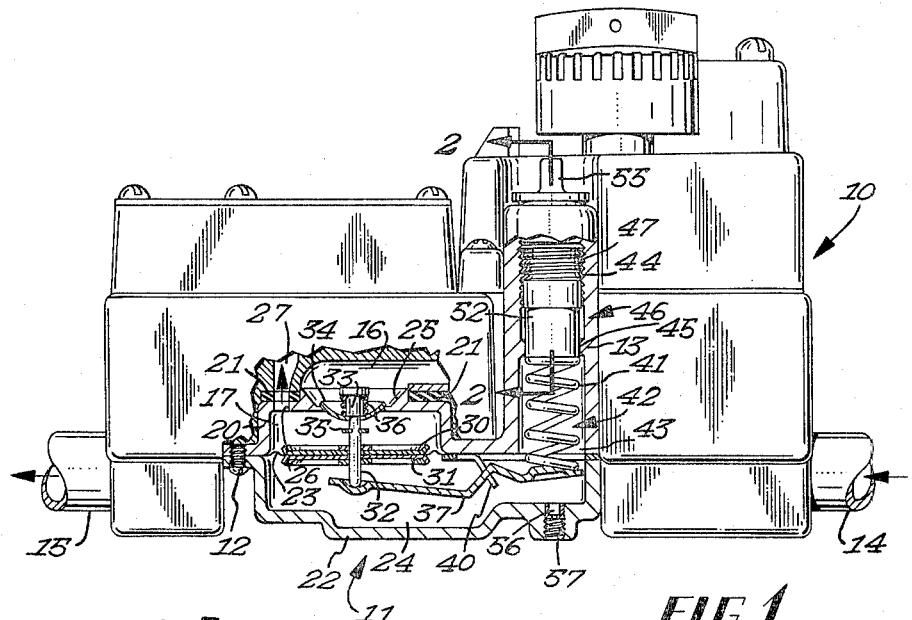
FIG 1
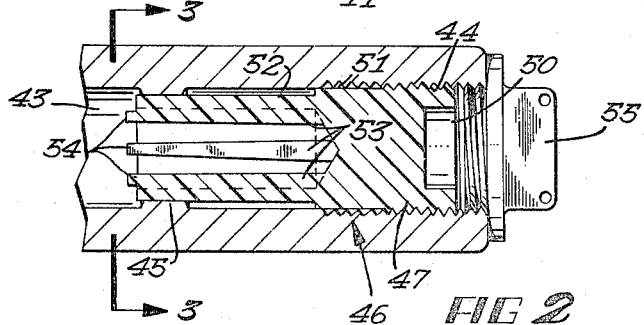
FIG 2
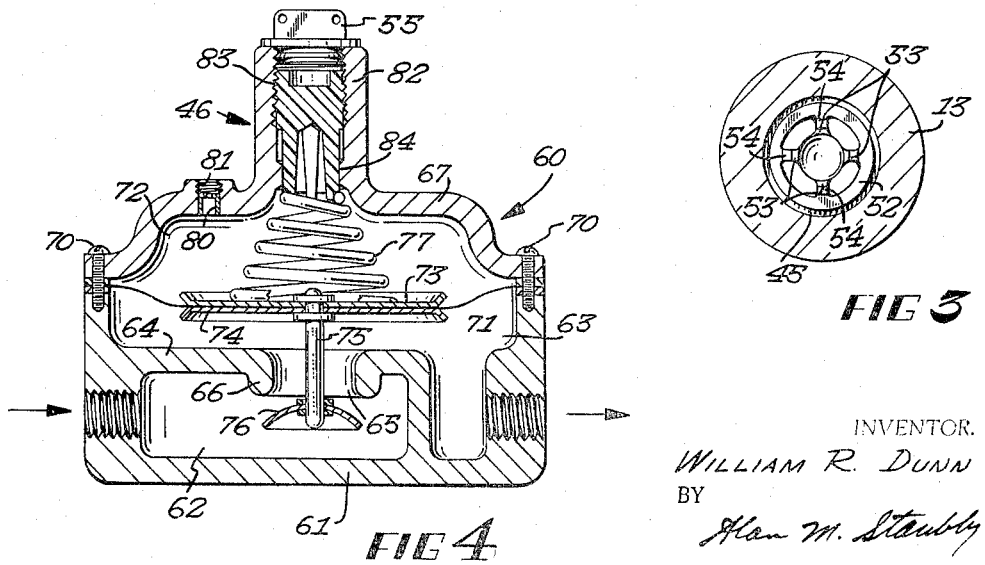
FIG 3
FIG 4
INVENTOR.
WILLIAM R. DUNN
BY
Alan M. Staubly
ATTORNEY United States Patent Office 3,289,692
Patented Dec. 6, 1966

3,289,692
SPRING ADJUSTING MEANS FOR A PRESSURE OPERATED VALVE
William R. Dunn, Los Angeles, Calif., assignor to Honeywell Inc., Minneapolis, Minn., a corporation of Delaware
Filed Aug. 5, 1964, Ser. No. 387,596
8 Claims. (Cl. 137—505)

The present invention relates to control apparatus and more specifically to an improved adjustment apparatus for adjusting the loading on a pressure responsive operator for a pressure operated valve or the like.

Many types of pressure operated devices, such as valves or the like, have a pressure responsive member which is acted upon by fluid pressure to urge it in one direction and biased in the opposite direction, in opposition to the pressure, by a loading spring. It is often desirable, if not absolutely essential, that provision be made for adjusting the loading spring so that the valve can be calibrated after its assembly, either in the factory or in the field after it is actually installed in the place where it is to be used. Provision for such calibration is generally made by providing a threaded opening connecting into the chamber where a loading spring is located and providing an adjustment member which is threaded into this opening. Adjustment of the loading on the spring can be made by turning the threaded adjustment member into or out of the opening to more or less deform the loading spring. Generally, the inner end of this adjustment screw directly abuts the end of the loading spring. In some instances, where the valve is subjected to vibration, this conventional adjustment screw has tended to rotate out of adjustment.

In many instances it is necessary that a fluid tight seal be provided between the adjustment member and the housing into which it is threaded. In the past this has been accomplished in a number of different ways, one of the most common of which is the use of an O-ring between the adjustment member and the housing.

The present invention provides an improved adjustment apparatus for adjusting the loading in pressure operated devices of the type described above. Briefly stated, my invention lies in the provision of a generally cylindrical opening in a valve housing member with the inner end of this opening connecting into the chamber which houses the loading spring. This opening has an outer end which is internally threaded and between this outer end and the inner end is located an inwardly extending annular flange. Into this opening is inserted a cooperating member which has an externally threaded base portion and a thin annular skirt portion extending axially therefrom. Preferably there are provided inside of the skirt portion, a plurality of axially extending stiffening ribs which add to the rigidity of the skirt portion. These ribs extend a short distance beyond the end of the skirt portion to provide a retainer for the free end of the loading spring. This member is formed of a resilient material such as nylon or the like and, when the base portion is threaded into the threaded portion of the elongated opening, the skirt portion is press-fitted through the annular flange and forms a fluid-tight seal therewith because of the resiliency of the adjustment member. The extending ends of the stiffening ribs extend into the last coil on the free end of the loading spring and consequently act as a retainer for the spring. With this arrangement, a single adjustment member, cooperating with the housing member formed with the appropriate elongated opening therein, actually performs four functions. It provides for adjustment of the loading on the spring, a fluid tight seal between the member and the housing, and it provides a retaining means for the free end of the loading spring. It also tends to be self-locking to prevent rotation due to vibration.

Due to the simplicity of the adjustment apparatus constructed according to my invention and the consequent low cost thereof, it may find application in many types of pressure responsive devices. For example, I have found that it is particularly applicable for use in connection with pressure regulator valves, particularly those which provide for step opening or slow opening due to a restricted connection between the control chamber and the atmosphere.

An object of my invention is to provide an improved adjustment apparatus for selectively loading the loading spring of a pressure responsive device.

Another object of my invention is to provide an adjustment apparatus for pressure responsive devices of the type wherein a threaded adjustment member is threaded into an opening in a housing adjacent the loading spring, and wherein the adjustment member is so constructed that the member itself provides a fluid-tight seal between the housing and the adjustment member and provides a friction lock with the housing to prevent rotation with respect thereto due to vibration.

A further object of my invention is to provide adjustment apparatus of the type described, so constructed that a single adjustment member provides for adjustably loading the biasing spring, provides a seal between the adjustment member and the operator housing, provides an anti-rotation friction lock with respect to the housing, and further provides a retaining means for the free end of the biasing spring.

These and other objects of the invention will become apparent upon reading the following description and claims taken in conjunction with the drawing wherein:

FIGURE 1 is a side elevational view of a manifold gas valve wherein portions are broken away to disclose a fluid pressure regulator having incorporated therein the adjustment apparatus of the present invention.

FIG. 2 is an enlarged, fragmentary, cross-sectional view of the adjustment apparatus taken generally along line 2—2 in FIGURE 1.

FIGURE 3 is a cross-sectional view of the adjustment apparatus taken generally along lines 3—3 of FIGURE 2.

FIGURE 4 is a somewhat schematic, cross-sectional view of a more conventional fluid pressure regulator utilizing the adjustment apparatus of my invention.

Referring first to FIGURE 1, reference numeral 10 generally designates a manifold gas valve having incorporated therein a pressure regulator valve 11, of the type generally known as a stack-type regulator. Regulator 11 actually is an inverted regulator which is attached to the underside of the housing of manifold valve 10 by appropriate means such as screws 12 and has a housing or stack 13 for the diaphragm loading spring. This stack extends upward adjacent the side of the housing of manifold valve 10 and terminates substantially adjacent the top surface thereof.

As seen in FIGURE 1, manifold valve 10 has an inlet 14 and an outlet 15. Fuel enters the manifold valve through inlet 14 and passes through various valving apparatus such as a plug valve and a flame responsive safety valve (not shown) and then enters a passage 16 which acts as an inlet chamber for the regulator valve 11. An outlet chamber 17 in the regulator is separated from inlet chamber 16 by a wall 20 which, as can be seen in the drawing, is sealed with respect to the housing of manifold valve 10 by a gasket member 21. Actually the wall 20 is a portion of a cup shaped member which is integral with the stack or housing 13 previously discussed. Regulator 11 also has a lower cover member 22 which may be attached to the upper member 20 by the same screws 12 which are used to attach the regulator to the manifold valve. Intermediate the members 20 and 22 is clamped a diaphragm 23 which has one side exposed to the outlet chamber 17 of the regulator and the other side exposed to the interior of the bottom cover 22 thus defining a control chamber 24.

Wall 20 has formed therethrough a valve seat opening 25 and also a passage 26 which passes through the wall and through the gasket 21 connecting the outlet passage 17 to a passage 27 in the manifold valve which in turn is connected through appropriate valve apparatus, such as a thermostatic valve (not shown) to outlet 15 of the manifold valve. Diaphragm 23 has attached thereto, on opposite sides thereof, stiffening plates 30 and 31. Passing through a central aperture in these plates and in the diaphragm and attached thereto by appropriate means, not shown, is a valve stem 32. Adjacent the upper end of stem 32, above the diaphragm 23, is an enlarged portion 33 which acts as a first valve member. Also carried by the stem 32 is a second valve member 34 which has an opening formed therethrough which is somewhat larger than the diameter of the main portion of stem 32 but smaller than enlarged portion 33 thereof. Appropriate means such as a snap ring 35 on stem 32 permits limited axial movement of valve member 34 with respect to the stem after assembly. A spring 36 intermediate valve members 33 and 34 normally urges the two members apart so that there appears a valve opening between the aperture in valve 34 and stem 32. Obviously, when the stem 32 is moved downwardly, valve 34 will first seat on the valve seat opening 25 and further movement of the stem will result in seating of valve 33 on the opening in valve 34.

Acting upon the lower end of stem 32 is one end of a lever 37 which is pivoted on a member 40. The other end of lever 37 is acted upon by one end of a regulator loading spring 41. This loading spring 41 extends from the control chamber 34 into an opening 42 in the stack 13. Reference should here be had also to FIGURE 2 wherein the upper portion of the spring housing member 13 and also an adjustment member to be described hereinafter are disclosed in an enlarged cross sectional view. As can be seen in the FIGURES 1 and 2, the opening 42 includes an inner portion 43 which connects to the control chamber and also an outer portion 44 which is internally threaded. Intermediate these two ends of the passage is an inwardly extending flange 45 which has an inner diameter somewhat smaller than the remainder of the cylindrical opening. Located in this opening is an adjustment member generally designated by the numeral 46.

Adjustment member 46 is formed of a relatively resilient material which will be somewhat deformed upon being inserted into the opening in the housing 13. This member 46 includes a threaded base portion 47 which forms the outer end of the member. This outer end of base portion 47 may have formed therein a screw driver slot 50 to facilitate adjustment of the member with respect to the housing 13. This base portion 47 may also include a non-threaded portion 51 extending axially therefrom, and from the base portion extends a thin annular skirt portion 52. This skirt portion has a generally cylindrical outer surface with a diameter just slightly larger than the inner diameter of the inwardly extending flange 45 of the housing 13. The skirt portion 52 is formed with a relatively thin wall to render it somewhat deformable. Inside of the skirt portion 52 there are preferably provided a plurality of stiffening ribs 53 which are integral with the base portion and the skirt portion and extend axially from the base portion, along the interior of the skirt portion, and have a relatively short end portion 54 extending beyond the terminal end of the skirt portion. End portions 54 may be formed so that co-operatively their outer surfaces define a circuit with a diameter somewhat less than the inner diameter of the skirt portion. Any number of the stiffening ribs may be used but I have found that four of the ribs, as disclosed in the drawing, equally spaced about the interior of the skirt portion, provide adequate rigidity to the skirt portion while still rendering it somewhat radially deformable.

Adjustment member 46 is inserted into the opening 42 in the spring housing 13. The base portion 47 is threaded into the internally threaded portion 44 of the spring housing, and the skirt portion 52 is press-fitted through the flange 45. This interference fit can be accomplished due to the resilience of the material of which the adjustment member 46 is constructed and further due to the relatively thin walls of the skirt portion. The press-fit of the skirt portion through the flange provides a fluid tight seal and anti-rotation means between the two members. The extending ends 54 of the stiffening ribs 53 act as a retainer for the loading spring 41 in that when the adjustment member is inserted into the opening of the spring housing member, these extending ends of the ribs are encircled by the last coil on the free end of the loading spring as this coil abuts the end of skirt portion 52.

With the adjustment apparatus discussed above, the single adjustment member cooperating with the specially formed opening in the spring housing 13, provides for adjustment of the loading spring 41 and prevents rotation of the adjustment member as well as providing a fluid tight seal between the adjustment member and the spring housing, and further provides a retainer or guide for the free end of the loading spring. A cap member 55 may be threaded into the upper end of the housing member 13 after the adjustment member has been moved to its desired axial position. The only function of this cap member 55 is to prevent tampering with the adjustment member 46.

As is well known to those who are familiar with fluid pressure regulators, the control chamber thereof is generally connected to atmosphere. In the specific structure which I have chosen to use by way of example in describing my invention, the pressure regulator valve provides step opening. Consequently the connection between control chamber 24 and atmosphere is made through a leak limiter or restricted opening 56 which is inserted in a tapped opening 57 which may be connected to some remote point for safety reasons by appropriate piping which is not shown in the drawing.

The importance of the fluid tight seal provided by my improved adjustment apparatus can be best appreciated by briefly considering the operation of the valve disclosed in FIGURE 1. When flow through the manifold valve 15 is stopped, as by the closing of a valve (not shown) intermediate the passage 27 and the outlet passage 15, pressure builds up in the outlet chamber 17 of the pressure regulator and moves diaphragm 23 downward in opposition to the bias of spring 41. This results first in the seating of valve member 34 on its seat and, subsequently, in the seating of valve member 33 on the seat provided around the aperture in valve member 34. When the valve downstream of the regulator is opened, the pressure in outlet chamber 17 is relieved but, due to the restriction provided by leak limiter 56, the diaphragm moves upwardly slowly with spring 36 maintaining valve member 34 closed while valve 33 opens to give step opening, generally for ignition purposes. The diaphragm continues to move upward slowly as air bleeds into the control chamber 24 and finally the valve member 34 moves away from its seat. With this operation, the necessity of a good seal between the adjustment member and the stack into which it is inserted can readily be seen. First of all, leakage around this adjustment member will interfere with the step opening of the valve which is provided by the limiter 56. Secondly, as noted above, the capped opening 57 may be connected to some remote point for safety reasons, i.e. so that, should the diaphragm 23 rupture, gas leaking therethrough would be released only at some safe point remote from the valve. Obviously the provision of these safety features would be of little value if the gas could leak out around the adjustment member 46.

FIGURE 4 discloses a more conventional type pressure regulator valve which utilizes my improved adjustment apparatus. Referring to FIGURE 4, the numeral 60 generally refers to the pressure regulator valve which includes a main body member 61 having formed therein an inlet chamber 62 and an outlet chamber 63 separated by a wall 64. Wall 64 has formed therein an opening 65 which is surrounded by a valve seat 66. An upper cover member 67 is attached to the main body member by appropriate means such as screws 70 and clamped between these two members is a diaphragm 71 which separates the outlet chamber 63 and a control chamber 72 which is formed in cover 67. Diaphragm 71 has, on opposite sides thereof, stiffening plates 73 and 74 and extending through a central aperture in the stiffening plates and the diaphragm is a valve stem 75 which is attached to the diaphragm by any appropriate means and which extends through the opening 65. On the stem 75, in the inlet chamber 62, is mounted a valve closure member 76 which is adapted to cooperate with the valve seat 66. A spring 77, situated in the control chamber 62, has one end engaging the stiffening plate 73 and is adapted to urge the diaphragm to a valve opening position in opposition to the pressure of fluid in the outlet chamber of the valve.

Control chamber 72 may be connected to atmosphere by a restriction or leak limiter 80 which is mounted in a tapped opening 81, which in like manner to the restricted opening discussed in connection with the valve of FIGURE 1, may be connected to some remote point for safety purposes. Cover member 67 has an upwardly extending neck or housing portion 82 which has formed therethrough a generally cylindrical opening similar to the opening 42 discussed in connection with housing member 13 of the valve of FIGURE 1. This cylindrical opening has an inner portion connecting to the control chamber 72 and an outer portion 83 which is internally threaded. Intermediate these two portions is an inwardly extending flange 84. Into this opening is threaded the adjustment member 46 which was discussed above. Again the skirt portion of this member is press-fitted through the inwardly extending flange 84 and provides a fluid tight seal therewith. The extending ends 54 of the stiffening ribs 53 are encircled by the last coil of the free end of the biasing spring and act as a retainer therefor.

It can be seen that the valve disclosed in FIGURE 4 may be utilized to provide a slow opening pressure regulator valve. In either of the embodiments described above, my adjustment apparatus provides, with a single adjustment member, means for adjusting the loading of the spring, friction to prevent rotation, a fluid tight seal between the adjustment member and the housing, and a retainer for the loading spring. As noted, the material used for the adjustment member 46 is not critical but it must be at least somewhat resilient and I have found that nylon has particularly desirable characteristics for this member. The adjustment apparatus described above is extremely simple and relatively inexpensive and yet provides a construction which is reliable and readily adapted to many types of pressure operated devices.

While my invention finds particular application in connection with pressure regulator valves and has been described in connection with valves of this type, it is to be understood that it may also be used in connection with various other pressure operated devices requiring an adjustment for the loading spring thereof. Obviously various modifications may become apparent to those skilled in the art without departing from the spriit of my invention. Therefore it is to be understood that the invention is to be limited only by the scope of the appended claims.

I claim:

1. A pressure regulator valve comprising: a valve body having inlet and outlet chambers separated by an apertured wall having a valve seat opening therethrough; a movable wall having one side exposed to fluid in said outlet chamber and the other side exposed to fluid in a control chamber; a valve closure member operably connected to said movable wall and cooperable with said valve seat with said movable wall adapted to move said closure member toward a closed position in response to pressure in the outlet chamber; a loading spring having one end operably connected to said movable wall and urging the movable wall in a valve-opening direction; a spring housing for said loading spring, said housing having a cylindrical opening therethrough having an inner end connected to the control chamber, an internally threaded portion adjacent the outer end of said opening, a spring enclosing portion adjacent the inner end of said opening, and an annular flange portion extending into said opening intermediate said threaded portion and said spring enclosing portion; and an adjustment member formed of a resilient material and including an externally threaded base portion threaded into the threaded portion of said opening, a relatively thin annular skirt portion extending axially from said base portion and of a diameter slightly greater than the inner diameter of said flange portion in the opening, and a plurality of axially extending stiffening ribs spaced about the inner periphery of said skirt portion and each extending to a position slightly beyond the end of said skirt portion, said adjustment member being so constructed that when said base portion is threaded into the threaded portion of said opening, said skirt portion extends into said flange portion and has an interference fit therewith to form a seal therewith and the extending ends of said ribs extend into the spring enclosing portion of the spring housing to form a retainer for the free end of the spring.

2. A pressure regulator valve comprising: a valve body having inlet and outlet chambers separated by a wall and connected by a valve seat opening therethrough; a movable wall having one side exposed to said outlet chamber and the other side exposed to a control chamber; a valve closure member operably connected to said movable wall and cooperable with said valve seat, said movable wall being adapted to move said closure member toward a closed position in response to pressure in the outlet chamber; a loading spring having one end operably connected to said movable wall and urging the movable wall in a valve-opening direction; a portion of the valve body having a generally cylindrical opening therethrough and having an inner end and an outer end, said inner end being connected to the control chamber, an internally threaded portion adjacent the outer end of said opening; an annular flange portion extending into said opening intermediate said threaded portion and the inner end of said opening; and an adjustment member formed of a resilient material and including an externally threaded base portion threaded into the threaded portion of said opening, a relatively thin skirt portion having a cylindrical outer surface and extending axially from said base portion, said skirt portion having a diameter slightly greater than the inner diameter of said annular flange in the opening, said adjustment member being so constructed that when said base portion is threaded into the threaded portion of said opening, said skirt portion extends into said flange portion and has an interference fit therewith to form a seal and extends therethrough to abut the free end of the spring.

3. Adjustment apparatus for a pressure regulator valve of the type including a housing having an inlet and an outlet connected by an opening having a valve seat associated therewith, a movable wall having one side exposed to pressure at the outlet and the other side exposed to a control chamber, a valve closure member cooperable with the valve seat and operably connected to the movable wall so that pressure at the outlet tends to close the closure member on the valve seat, and a spring in the control chamber urging the movable wall to a valve opening position, the adjustment apparatus comprising: a housing member having a cylindrical opening therethrough having an inner end for communication with the control chamber adjacent the position of the loading spring, and having an accessible outer end; an internally threaded portion of said housing intermediate the inner and outer ends of said opening; an inwardly extending annular portion of said housing intermediate the internally threaded portion and the inner end of said opening; and an adjustment member formed of a resilient material and including an externally threaded base portion adapted to be threaded into said threaded portion, a relatively thin skirt portion integral with said base portion and extending axially therefrom, said skirt portion having a cylindrical outer surface and an outer diameter slightly greater than the diameter of said annular portion in said opening, a plurality of axially extending stiffening ribs each co-extensive with said skirt portion and extending along the inner periphery thereof, each of said ribs extending beyond the end of said skirt portion to cooperatively form a retainer for the free end of the loading spring, said adjustment member being threaded into the opening in the housing member with said skirt portion extending into said annular portion and having an interference fit therewith, and the end of said skirt portion engaging the free end of the spring.

4. The adjustment apparatus of claim 3 wherein the adjustment member is formed of nylon.

5. Adjustment apparatus for adjusting the loading on a pressure operated valve of the type having a housing with a valve-operating, pressure responsive, movable wall mounted therein and dividing a portion of the housing into two chambers, and having a loading spring in one of the chambers, the loading spring having one end operably engaging the movable wall and urging it toward the other chamber, the adjustment apparatus comprising: a housing member having a cylindrical opening therethrough with an inner end connected to the chamber containing the loading spring and an accessible outer end; an internally threaded portion intermediate the inner and outer ends of said opening; an annular flange portion extending radially into the opening intermediate the internally threaded portion and the inner end of said opening; and an adjustment member formed of a resilient material and including an externally threaded base portion adapted to the threaded into the threaded portion of said opening, a thin annular skirt portion integral with said base portion and extending axially therefrom, said skirt portion having a generally cylindrical outer surface with a diameter slightly greater than the diameter of the flange portion in said opening, said adjustment member being threaded into the opening in the housing member with said skirt portion press-fit into said annular flange portion with the end of said skirt portion extending through said flange portion and engaging the free end of the spring.

6. The adjustment apparatus of claim 5 wherein said adjustment member is formed of nylon.

7. Apparatus for adjusting the loading on a pressure operated valve of the type having a housing with a valve operating, pressure responsive, movable wall mounted therein and dividing a portion of the housing into two chambers, and a loading spring in one of the chambers, the loading spring having one end operably engaging the movable wall and urging it toward the other chamber, the adjustment apparatus comprising: a housing member having a cylindrical opening therethrough with an inner end connected to the chamber containing the loading spring and an accessible outer end; an internally threaded portion intermediate the inner end outer ends of said opening; an annular portion extending radially into the opening intermediate the internally threaded portion of said opening and the inner end thereof; and an adjustment member formed of a resilient material and including an externally threaded base portion adapted to be threaded into the threaded portion of said opening, a thin annular skirt portion integral with said base portion and extending axially therefrom, said skirt portion having a generally cylindrical outer surface with a diameter slightly greater than the diameter of said annular portion, a plurality of axially extending ribs each integral with said skirt portion and spaced about the inner periphery thereof, each of said ribs extending from said base portion, along said skirt portion, and terminating a short distance beyond the end of said skirt portion to cooperatively form a retainer to be encircled by the free end of the loading spring, said adjustment member being threaded into the opening in the housing member with said skirt portion extending into said annular portion and having an interference fit therewith, and with the terminal end of said skirt portion extending through said annular portion and engaging the free end of the spring.

8. A combination adjustment, anti-rotation, sealing and spring retainer member for a pressure operated valve of the type having a loading spring urging a valve closure member to a position in opposition to the operating pressure and a housing member having a cylindrical opening therein, the opening including a first portion for housing the free end of the loading spring, an internally threaded second portion and an annular flange portion extending radially into the opening intermediate the first and second portions and having a diameter less than the diameter of the threaded portion, said member comprising: a unitary member formed of a resilient material and having an externally threaded base portion, a relatively thin-walled skirt portion integral with said base portion and having a cylindrical outer surface, and a plurality of axially extending ribs formed on the inner surface of said skirt portion and substantially equally spaced about the periphery thereof, said ribs extending from the base portion, along said skirt, and to a point slightly beyond the end of said skirt portion, said member being adapted to be inserted in the opening in the housing member with the base portion threaded into the threaded portion of the opening, said skirt portion force-fitted into the annular flange and extending therethrough to engage the loading spring and the extending ends of said ribs extending into the portion of the opening which houses the loading spring and together forming a retainer for the loading spring.

No references cited.

ALAN COHAN, *Primary Examiner.*

HAROLD WEAKLEY, *Examiner.*